(No Model.)
T. SAMPSON.
TENSION DEVICE FOR HARVESTERS.
No. 500,778. Patented July 4, 1893.
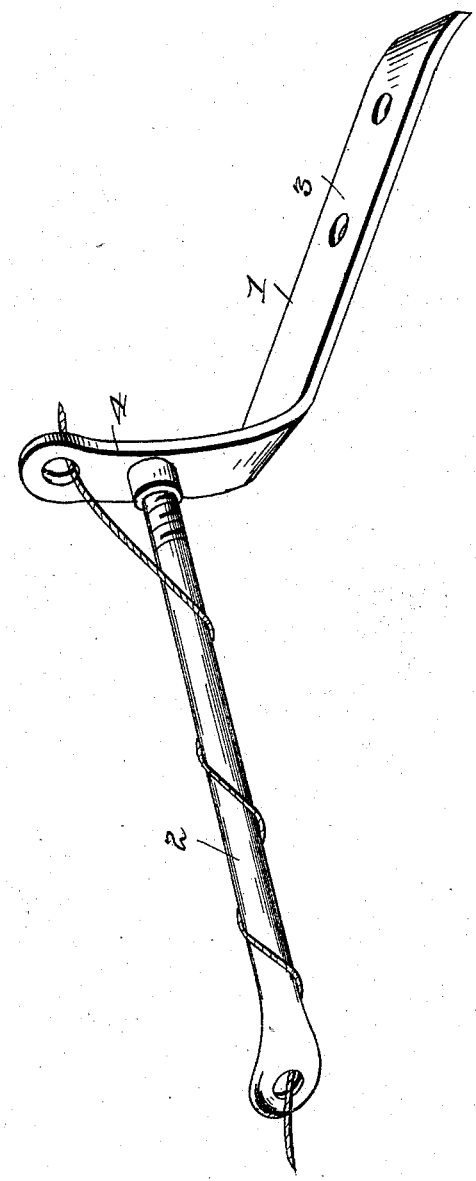
Attest
Walter Donaldson
F. L. Middleton
Inventor
Thomas Sampson
by Richards & Co
Attys

UNITED STATES PATENT OFFICE.

THOMAS SAMPSON, OF GAWLER, SOUTH AUSTRALIA.

TENSION DEVICE FOR HARVESTERS.

SPECIFICATION forming part of Letters Patent No. 500,778, dated July 4, 1893.

Application filed December 6, 1892. Serial No. 454,229. (No model.) Patented in South Australia December 7, 1891, No. 2,096, and in Victoria December 7, 1891, No. 9,302.

*To all whom it may concern:*

Be it known that I, THOMAS SAMPSON, farmer, a subject of the Queen of Great Britain, residing at Gawler, in the Province of South Australia, have invented an Improved Tension Device for Harvesters, of which the following is a full, clear, and exact description.

The invention has been patented in South Australia, No. 2,096, and in Victoria, No. 9,302, dated December 7, 1891.

My invention relates to an improved tension for the twine of that class of harvesting machines known as twine binders, in which sheaves are automatically bound by means of hemp or other twine. In the contrivance for regulating the tension at present in use the strain is obtained by means of a spring attachment. Constant trouble and difficulty is experienced through the tension caused by inequalities in the twine itself. For these reasons an even strain is not maintained upon the twine.

My invention consists of a straight rod or bar having a loop or rounded opening at its outer end through which the twine passes. The inner end of the bar is secured by means of a screw thread into an arm of suitable shape according to the particular harvesting machine to which it is to be bolted. The outer end of the bar in which the loop or rounded hole is made is also bent inward in order that the twine may run more freely.

In order that my invention may be the better understood, reference is made to the accompanying drawing, which is a perspective view of the device and from which it will be seen that the frame 1 carrying the tension or rod 2 is bent so as to form two projecting arms. In the lower arm 3 is an opening through which a bolt is passed for securing the contrivance to the harvesting machine. Through the shorter or upper arm 4 a rounded hole is made through which the twine passes from the reel or ball. The tension rod or bar is screwed into a threaded hole provided for the purpose in the body of the frame, and the outer end of the tension bar or rod is flattened and bent inward, being provided with a rounded edge.

In actual practice the tension is exceedingly simple. The twine is passed through the hole in the frame, wound two or more times round the bar, and passed through the hole in the flattened end. If from any cause it is desired to adjust the tension this can be readily done by turning the rod in order to give the twine more or less turns or twists.

From the construction of my invention one even tension is constantly maintained, knots or lumps are not formed in the twine, and and even though the latter have inequalities they will pass through the tension without interfering with the strain.

I wish it to be understood that I do not confine myself to the method of attaching the tension bar to the frame by means of a screw thread, but find that this method well answers the purpose of rendering the bar adjustable.

Having now particularly described and ascertained the nature of my said invention and in what manner the same is to be performed, I declare that what I claim is—

The herein described contrivance for adjusting the tension of the twine of harvesting machines consisting essentially of a bar or rod, upon the inner end of which is formed a screw thread and the outer end of which is provided with a loop, or is flattened and provided with a round hole, the loop or end being preferably bent inward, in combination with a bar or frame having a screw threaded hole for the inner end of the tension rod or bar and a rounded hole through which the twine passes substantially as herein described and for the purpose indicated.

In witness whereof I have hereunto set my hand in presence of two witnesses.

THOMAS SAMPSON.

Witnesses:
SAMUEL BRUCE RUDALL,
JOHN WILLIAM STEVENS.